United States Patent
Sugumar et al.

[11] Patent Number: 5,946,496
[45] Date of Patent: Aug. 31, 1999

[54] DISTRIBUTED VECTOR ARCHITECTURE

[75] Inventors: Rabin A. Sugumar, Sunnyvale, Calif.;
Stefanos Kaxiras, Madison, Wis.

[73] Assignee: Cray Research, Inc., Eagan, Minn.

[21] Appl. No.: 08/988,524

[22] Filed: Dec. 10, 1997

[51] Int. Cl.[6] .................................................. G06F 15/76
[52] U.S. Cl. ...................... 395/800.02; 395/395; 711/157
[58] Field of Search .................... 395/800.02, 800.04,
395/800.07, 800.1, 800.16, 800.28, 200.31,
376, 393, 394, 825; 711/100, 157, 170

[56] References Cited

U.S. PATENT DOCUMENTS

| | | | |
|---|---|---|---|
| 4,771,380 | 9/1988 | Kris | 395/800.06 |
| 4,884,190 | 11/1989 | Ngai et al. | 395/800.04 |
| 5,598,574 | 1/1997 | Yoshinaga et al. | 395/800.02 |
| 5,625,834 | 4/1997 | Nishikawa | 395/800.09 |
| 5,659,706 | 8/1997 | Beard et al. | 711/125 |
| 5,669,013 | 9/1997 | Watanabe et al. | 395/825 |
| 5,732,152 | 3/1998 | Bastkowiak | 395/562 |
| 5,805,875 | 9/1998 | Asanove | 395/563 |
| 5,809,552 | 9/1998 | Kuzoiwa et al. | 711/169 |

*Primary Examiner*—Alpesh M. Shah
*Attorney, Agent, or Firm*—Schwegman, Lundberg, Woessner, and Kluth, P.A.

[57] ABSTRACT

A vector/scalar computer system has nodes interconnected by an interconnect network. Each node includes a vector execution unit, a scalar execution unit, physical vector registers holding physical vector elements, a mapping vector register holding a mapping vector, and a memory. The physical vector registers from nodes together form an architectural vector register having architectural vector elements. The mapping vector defines an assignment of architectural vector elements to physical vector elements for its node. The memories from the nodes together form an aggregate memory.

17 Claims, 6 Drawing Sheets

DISTRIBUTED VECTOR ARCHITECTURE

RELATED APPLICATION

The present invention is related to the following commonly owned application Ser. No. 08/987,948, filed on Dec. 10, 1997, entitled "INTERLEAVING MEMORY IN DISTRIBUTED VECTOR ARCHITECTURE MULTIPROCESSOR SYSTEM" having Attorney Docket Number 200.659US1. This related application is herein incorporated by reference.

FIELD OF THE INVENTION

The present invention relates generally to the field of high-speed digital data processing systems, and more particularly, to scalar/vector multiprocessor computer systems.

BACKGROUND OF THE INVENTION

Multiprocessor computer systems typically comprise a number of processing element nodes connected together by an interconnect network. Each processing element node typically includes at least one processing element and corresponding local memory, such as dynamic random access memory (DRAM). The interconnect network transmits packets of information or messages between processing element nodes. In a typical multiprocessor system, every processing element can directly address all of memory, including the memory of another (remote) processing element, without involving the processor at that processing element. Instead of treating processing element-to-remote-memory communications as an I/O operation, reads or writes to another processing element's memory are accomplished in the same manner as reads or writes to the local memory.

There is an increasing gap between processing power and memory speed. One proposed solution to compensate for this gap is to have higher integration of processing elements and local DRAM memory. The current level of integration is at the level of the printed circuit board. Proposed integrations are for disposing processing elements and local memory on multi-chip modules (MCM) and for eventually disposing processing elements and local memory on the same integrated circuit chip. Such tightly coupled systems offer advantages, such as providing a substantial increase in the available bandwidth between the processor and its memory, and providing a reduction of the memory access latency. The bandwidth advantage is a result of the vastly improved ability to interconnect the processor with its memory banks. The latency advantage is a result of the elimination of the overhead of crossing chip boundaries.

With improved local memory bandwidth and improved local access latency, it has been proposed that vector units can be implemented on-chip. Such on-chip vector units can exploit significant local memory bandwidth because of their efficient issue and their ability to have deep pipelines. However, providing ample external bandwidth is expensive. This is evident in the design of current vector supercomputers, such as the CRAY C-90 and T-90 vector supercomputers sold by Cray Research, Inc. that employ static random access memory (SRAM) and elaborate interconnection networks to achieve very high performance from their memory systems. With the integration of vector units and memory on the same device (MCM or chip), systems can be built having the potential for significantly lower cost-performance than traditional supercomputers.

The importance of vector processing in the high-performance scientific arena is evident from the successful career of the vector supercomputer. One reason for this success is that vector processing is a good fit for many real-life problems. In addition, vector processing's serial programming model is popular among engineers and scientists because the burden of extracting the application parallelism (and hence performance) is realized by the vectorizing compiler. This proven vector processing model, now in use for two decades, is supported by significant vectorizing compiler technology and accounts for a very important portion of current scientific computation.

Nevertheless, vector applications are memory intensive and they would overflow any single device with a limited and non-expandable memory. Such memory intensive applications include weather prediction, crash-test simulations, and physics simulations run with huge data sets. Therefore, these applications require external memory access. Furthermore, processor-memory integration increases the relative cost of external accesses by making on-chip accesses much faster. However, providing a very expensive external memory system to speed up external accesses, would negate the cost-performance advantage obtained by integrated processor/memory device. Cache memory on the integrated device could help alleviate the cost of external accesses, but for a large class of vector applications caches are not as effective as in other applications.

For reasons stated above and for other reasons presented in greater detail in the Description of the Preferred Embodiments section of the present specification, there is a need to for an improved distributed vector architecture for a multiprocessor computer system having multiple integrated devices, such as MCMs or chips, where each device includes a processing element, memory, and a vector unit.

SUMMARY OF THE INVENTION

The present invention provide a method and vector/scalar computer system having a plurality of processing element nodes interconnected by an interconnect network. Each processing element node includes a vector execution unit, a scalar execution unit, physical vector registers holding physical vector elements, a mapping vector register holding a mapping vector, and a memory. The physical vector registers from the plurality of processing element nodes together form an architectural vector register having architectural vector elements. The mapping vector defines an assignment of architectural vector elements to physical vector elements for its node. The memories from the plurality of processing element nodes together form an aggregate memory.

In one embodiment, the processing element nodes each have their vector execution unit, scalar execution unit, physical vector registers, mapping vector register, and memory integrated in one integrated device, such as a multi-chip module or an integrated circuit chip.

In one embodiment, the mapping vector is dynamically created and then stored in the mapping vector register with a special vector instruction. In one embodiment, the mapping vector is created and then stored in the mapping vector register at compile time. In another embodiment, the mapping vector is created and then stored in the mapping vector register at run time prior to a computation slice.

In one embodiment, a given vector application running on the vector/scalar computer system references the architectural vector registers. The memories store memory vector elements. The given vector application loads memory vector elements from the memories to the physical vector registers, and stores physical vector elements from the physical vector registers to the memories. In one embodiment, the memory vector elements are interleaved among the memories of the plurality of processing element nodes to reduce inter-node traffic during the loads and the stores.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Distributed Vector Architecture

Figure 1:
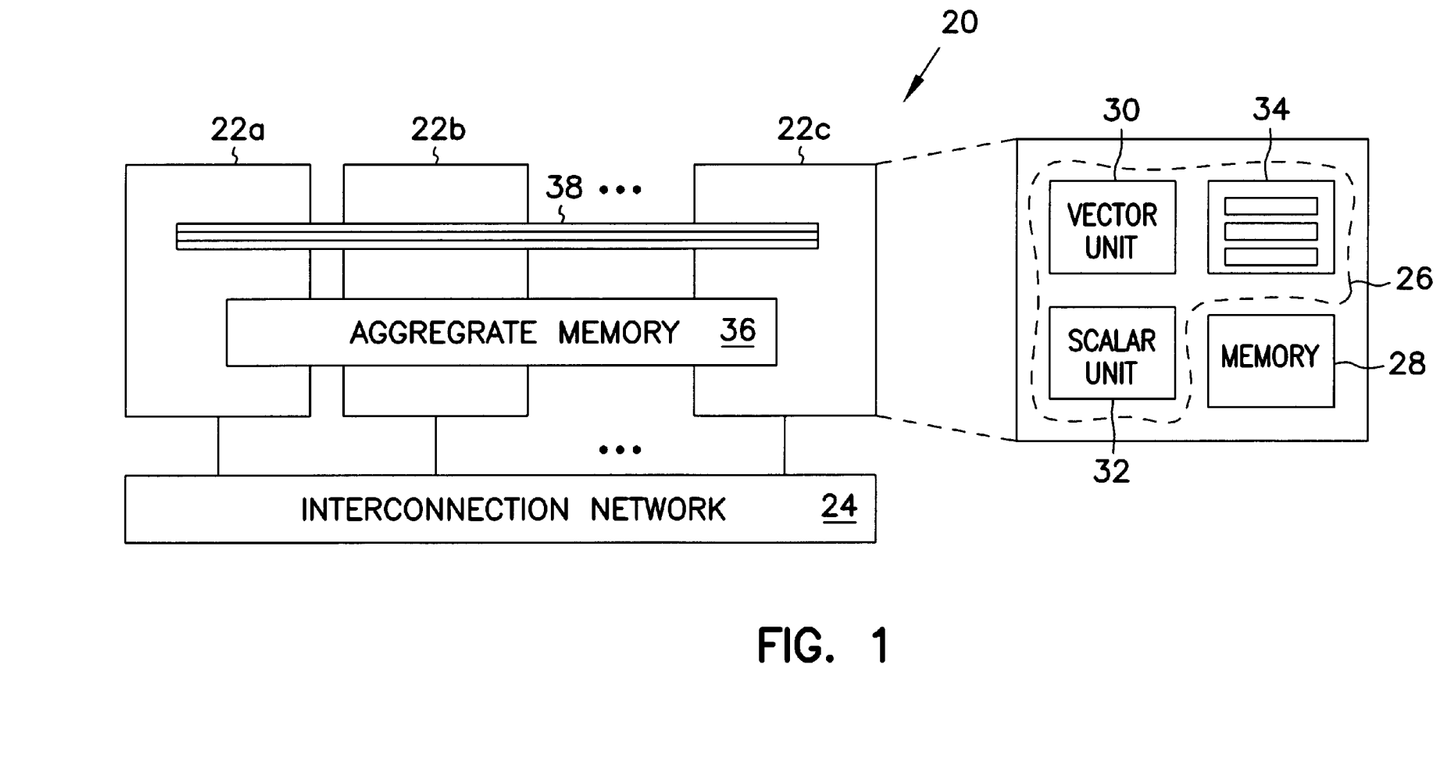
FIG. 1 is a block diagram of multiprocessor vector/scalar computer system, or portion of a larger multiprocessor computer system, having a distributed vector architecture according to the present invention.

A representative multiprocessor vector/scalar computer system, or portion of a larger multiprocessor computer system, having a distributed vector architecture according to the present invention is indicated generally at 20 in FIG. 1. As illustrated in FIG. 1, multiprocessor computer system 20 includes up to n nodes 22, such as indicated by a first node 22a, a second node 22b, and an nth node 22c. The nodes 22 are interconnected by a scalable interconnect network 24, which permits the number of nodes 22 in multiprocessor vector/scalar computer system 20 to be scaled. Scalable interconnect network 24 can be implemented with any suitable interconnection network, such as a bus, mesh, ring, torus, hypercube.

Each node 22 is preferably a highly integrated processor-memory device with vector capabilities. In one embodiment, the integrated processor-memory device is a multi-chip module (MCM), and in another embodiment the integrated processor-memory device is a single integrated circuit chip. Each node 22, as illustrated in detail for the nth node 22c, includes a processor 26 and a memory 28. In an alternative embodiment, multiple processors 26 are included in each node. Processor 26 includes a vector execution unit 30, a scalar execution unit 32, and physical vector registers 34. All of the local memories 28 of the n nodes together form an aggregate memory, indicated at 36. All of the physical vector registers 34 of the n nodes together form architectural vector registers, indicated at 38.

The vector applications of interest to the present invention are single-threaded vector applications or a single thread of a parallel application that is not amenable to further high level parallelization. In addition, the vector application of interest has memory requirements that exceed the memory capacity of any memory 28 of the n nodes 22. Aggregate memory 36 of the n nodes, however, satisfies the memory requirements of the vector application of interest. Typically, no other additional memory is present in the system 20 beyond the memories 28 of the n nodes 22.

A vector application running on all n nodes 22 typically occupies memory locations in all of the memories 28 of the n nodes. Such a vector application references architectural vector registers 38 that are the aggregate of the physical vector registers 34 of each of the n nodes 22. The length of the architectural vector registers 38 depends on the number of nodes 22 used by the vector application and the length of the physical vector registers 34 in these nodes.

One straightforward solution to execute a vector application that does not fit in the memory of one node would be to execute the application on a processor of one node, but use memory on other nodes to hold its data set. However, the present invention employs the vector capability of all the integrated processor-memory nodes 22 to work simultaneously on the vector application. The aggregate vector power of the n nodes 22 speeds up vector instructions. In addition, external communication is reduced by loading and storing vector elements locally on the n nodes 22.

In addition, the present invention, as described in detail below, provides a system and method of assigning elements of the architectural vector registers 38 to the elements of the physical vector registers 34. The elements of the architectural vector registers 38 are distributed around the nodes 22 to increase the locality of vector loads and stores. Mapping vectors define the correspondence of architectural elements to physical elements. The mapping vectors are set at any instant by the application to reduce external communication. By applying heuristics to select mapping vectors, as well as heuristics to interleave the memory, locality for vector loads and stores is achieved that leads to less remote communication than other approaches based on caches.

Operation of Distributed Vector Architecture and Execution Model

Each processor 26 has scalar and vector execution capability via scalar execution unit 32 and vector execution unit 30 respectively. The basic structure of processor 26 can be that of any suitable known vector processor, such as found in the CRAY PVP machines, sold by Cray Research, Inc. Scalar execution unit 32 performs scalar computations and flow control. Vector execution unit 30 processes vector instructions via its corresponding physical vector registers 34. Physical vector registers 34 are loaded from and stored to memory 28 through explicit instructions. All vector computation instructions work on physical vector registers 34.

In a traditional mode of operation, nodes 22 operate like traditional vector processors where each node works independently on an application. This traditional mode of operation works well when an application fits into a single node 22. In a cooperative mode of operation according to the present invention, multiple nodes 22 work together on a single vector application whose data set is distributed among the nodes' memories 28.

In one embodiment of the cooperative mode of operation, all nodes 22 execute all scalar instructions of the application. In this embodiment, each processor 26 maintains its own scalar register set and performs all scalar computations in a redundant fashion. When a processor 26 accesses scalar data that resides in its local memory, that processor is referred to as an owning processor. The owning processor 26 broadcasts the accessed data to other nodes. When a processor 26 tries to access remote scalar data, that processor receives the scalar data from the owning processor 26 that broadcasted the scalar data. Such a broadcast scheme is described in detail in H. Garcia-Molina, R. J. Lipton, and J. Valdes, *A Massive Memory Machine,* IEEE Transactions on Computers, C-33(5), at 391–399, May 1984, which describes a system with massive memory from a cluster of computers.

Figure 2:
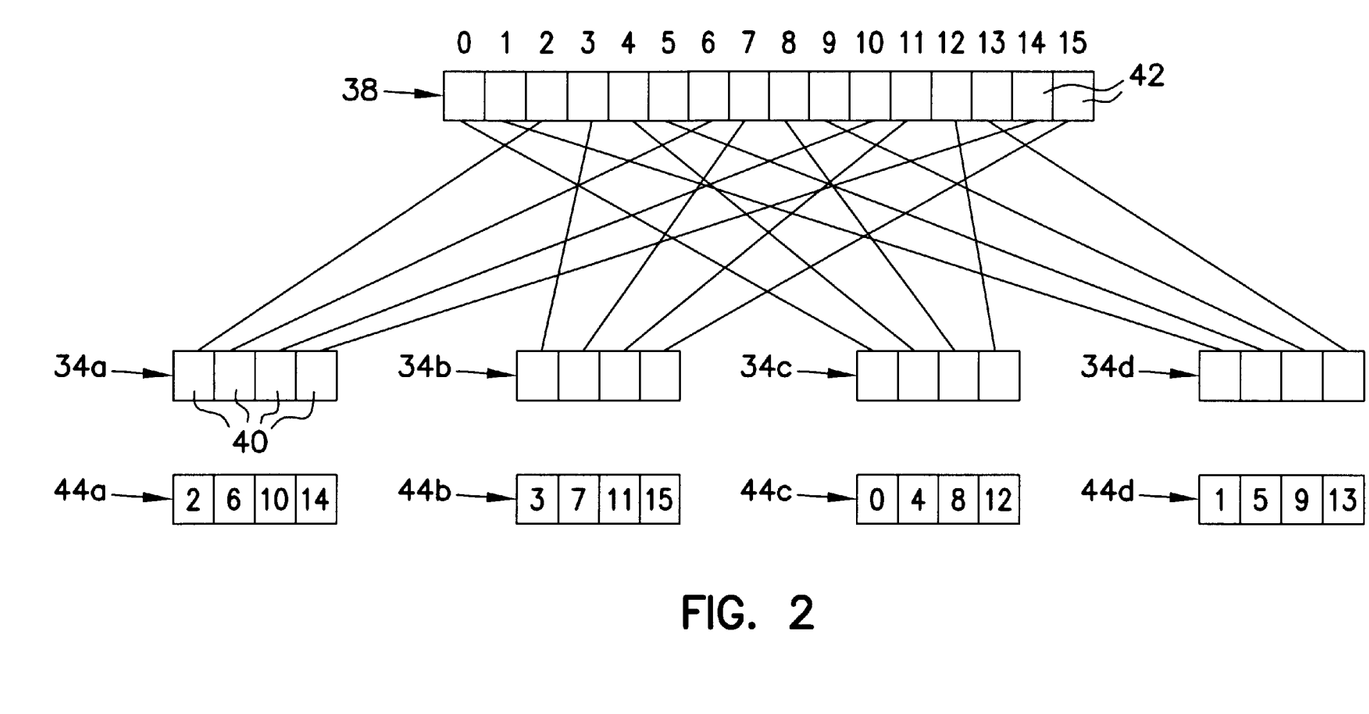
FIG. 2 is a diagram of an example four node application where physical vector registers combine to form architectural vector registers.

In the cooperative mode of operation, nodes 22 cooperate on the execution of vector instructions, with each node executing a different part of the instruction in parallel with other nodes. This partition of work is possible, because vector instructions refer to architectural vector registers 38, while nodes 22 operate only on their physical vector registers 34. FIG. 2 illustrates an example four node application where physical vector registers 34 combine into architectural vector registers 38. In the FIG. 2 example, four physical vector registers 34a–d, each having four physical vector elements 40, combine to form an architectural vector register 38 having sixteen architectural vector elements 42 (numbered 0:15). Vector instructions that refer to architectural vector register 38 execute with a potential four-fold speed-up.

A mapping vector describes the assignment of architectural vector elements 42 to physical vector elements 40. The mapping vector is distributed in mapping vector registers 44a–d contained in each of four nodes 22. Architectural vector elements 42 are preferably assigned in nodes 22 where the corresponding memory data is located to thereby reduce the number of external accesses needed to load or store these vector elements.

A mapping vector must be created and stored in mapping vector registers 44 to permit use of the physical vector registers 34 that together form an architectural vector register 38 for vector instructions. In one embodiment, a SETMV instruction is employed as a mechanism to create a mapping vector. The following example code I of a simple program loop and its corresponding compiled sequence of vector instructions provides an illustration of the use of mapping vectors.

Example Code I

```
        DO 100 I=1,16
        C(I)=A(I)+B(2*I)
100     CONTINUE
Compiled to:
        SETMV MV0
        VLOAD V0, BASE=A, STRIDE=1, MV0 (VL=16)
        VLOAD V1, BASE=B, STRIDE=2, MV0 (VL=16)
        VADD V0, V0, V1/* V0=V0+V1 */
        VSTORE V0, BASE=C, STRIDE=1, MV0 (VL=16)
where,  MV0 =0 mapping vector 0
        V0 = architectural vector register V0
        V1 = architectural vector register V1.
```

The SETMV instruction defines a mapping of architectural vector elements 42 to physical vector elements 40. In the above example code I, this mapping must be the same for the physical vector registers 34 that combine to form architectural vector register V0 and for the physical vector registers 34 that combine to form architectural vector register V1. This is because V0 and V1 are added together which requires exact alignment of V0 and V1 elements in the corresponding physical vector registers 34. The necessary alignment of the V0 and V1 elements for the vector add instruction is guaranteed by specifying that both V0 and V1 are loaded using mapping vector MV0.

Figure 3:
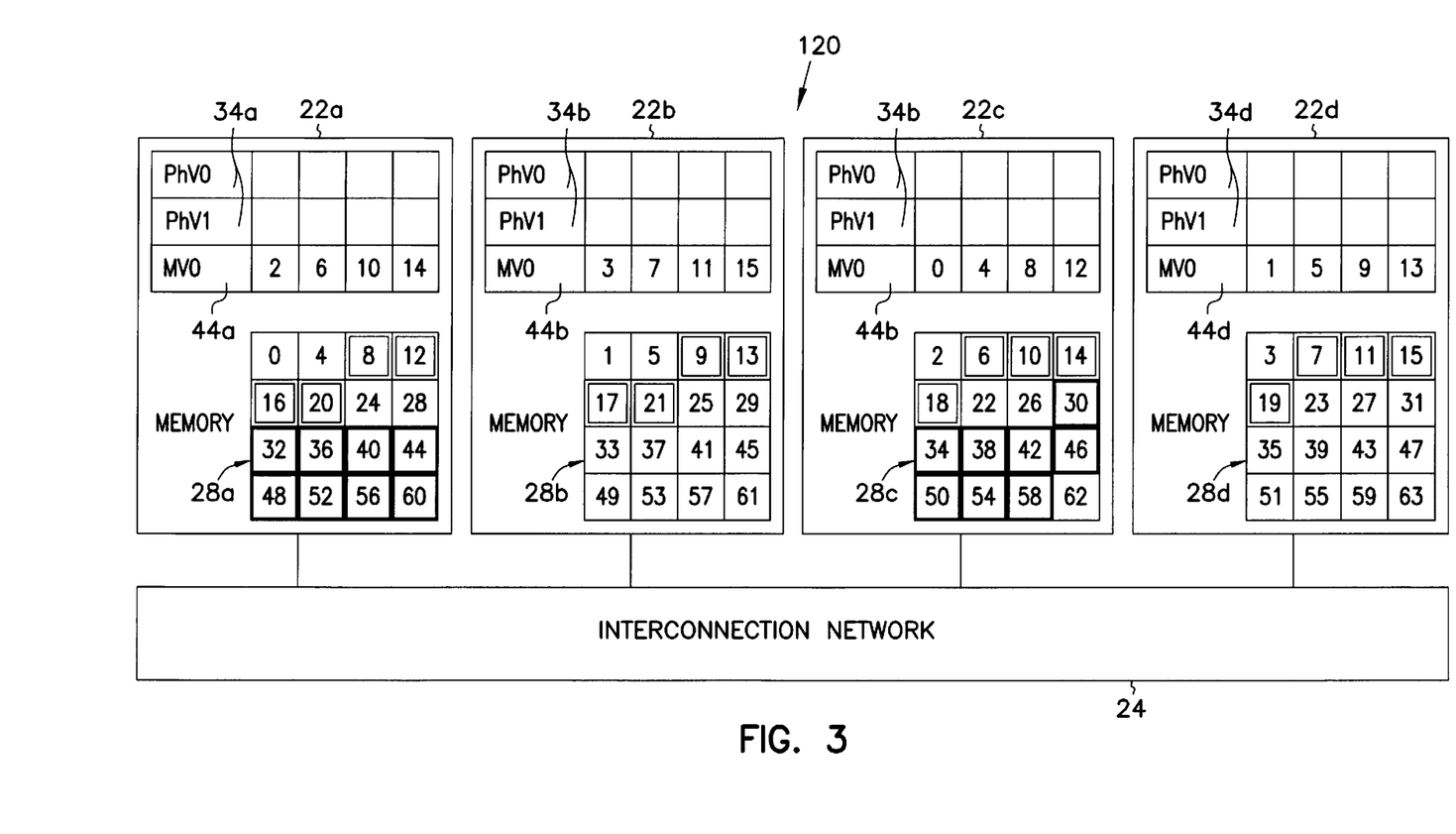
FIG. 3 is a block diagram of a distributed vector architecture system according to the present invention illustrating the execution of an example code.

An example four node distributed vector architecture system for execution of the above example code I is illustrated generally at 120 in FIG. 3. System 120 includes four nodes 22a–d. For this example, each node 22 includes two physical registers 34, indicated as PhV0 and PhV1. For this example, each node 22 also includes one mapping vector 44, indicated as MV0. In this example, sixteen words of memory 28 are shown in each node 22 for a total of 64 words (0:63) of aggregate memory 36 for all four nodes 22a–d. Each of the physical vector registers PhV0 and PhV1 has a length of four physical vector elements 40. Thus, four PhV0s combine to form architectural vector register V0 having a length of sixteen, and four PhV1s combine to form architectural vector register V1 having a length of sixteen.

As illustrated in FIG. 3, where the address of each memory location is shown, aggregate memory 36 is word-interleaved for this example. That is, consecutive words map on adjacent nodes 22. In a more typical embodiment, aggregate memory 36 is block-interleaved specifically for each application to provide a better lay-out of memory vectors. A discussion of memory interleaving is discussed below under the Memory Interleaving heading.

In FIG. 3, the highlighted areas in memories 28 represent the memory vectors A (doubled outlined boxes) and B (bold outlined boxes) which are referenced in the above example code I. As indicated, memory vector A starts at address 6 and is accessed with a stride of 1. Memory vector B starts at address 30 and is accessed with a stride of 2.

FIG. 3 illustrates the state of system 120 after the execution of the SETMV instruction, which sets the mapping vectors in every node 22. When nodes 22 encounter the first vector load instruction, each node 22 loads its physical vectors with the vector elements described in its mapping vectors. In this example, vector elements of a physical vector are loaded according to the following formula:

PhV0[i]←(BaseAddress+Stride×MV0[i]), where I=0,1,2, 3.

In the typical embodiment, the number of valid entries in mapping vector registers 44 controls the length of the vector operations in each node 22.

Figure 4:
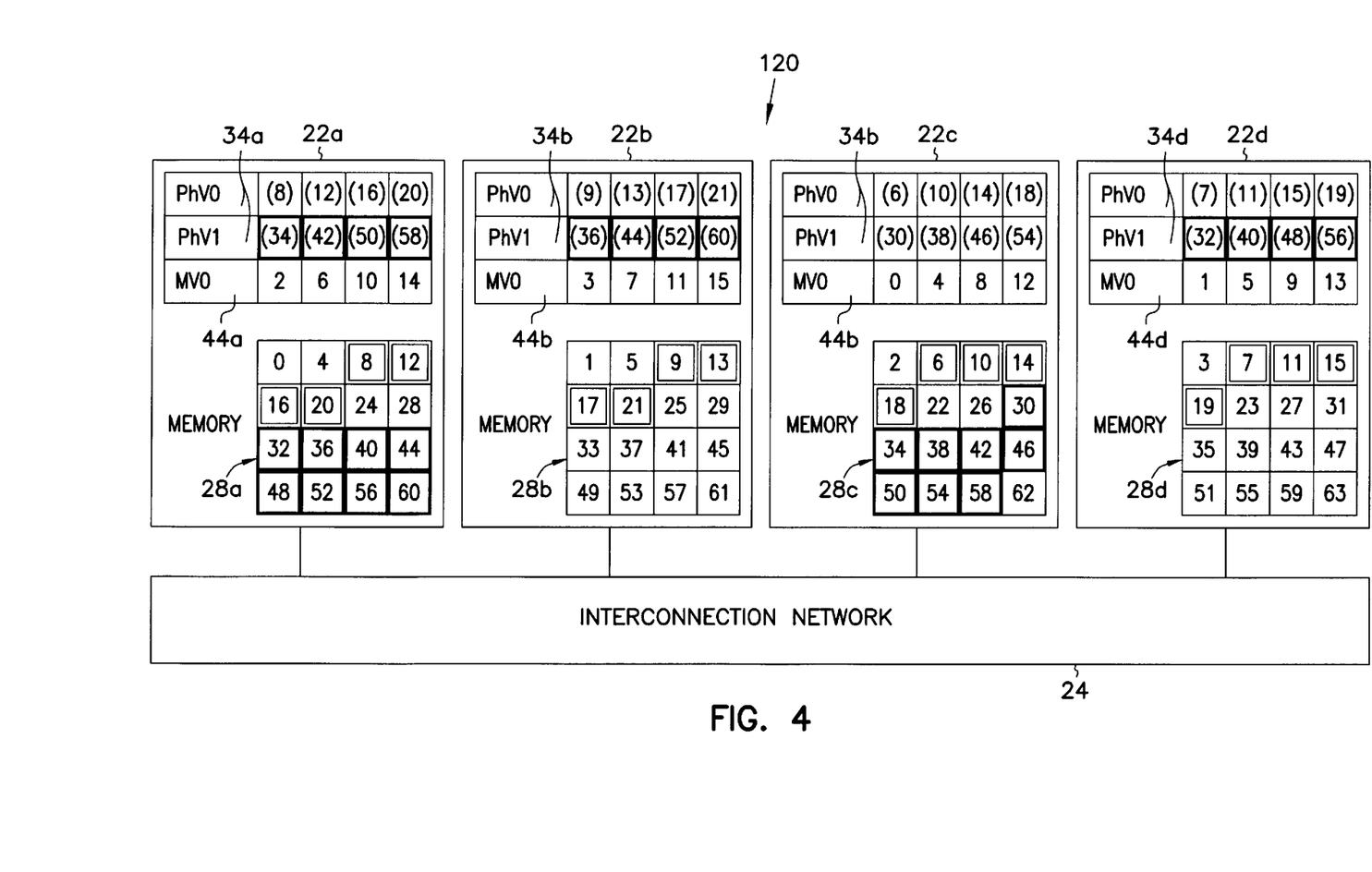
FIG. 4 is a block diagram of a distributed vector architecture system according to the present invention illustrating the execution of the example code at a later time than FIG. 3.

FIG. 4 illustrates the state of the system 120 after executing the two loads of PhV0 and PhV1 for the above example code I. As indicated in FIG. 4, for this example the mapping vector is set to mirror the lay-out of memory vector A in memories 28. Thus, vector element 0 of architectural vector register V0 is assigned to node 22c, where the starting address 6 of vector A is located. Vector element 1 of V0 is assigned to node 22d, where address 7 is located. Vector element 2 of V0 is assigned to node 22a, where address 8 is located. Vector element 3 of V0 is assigned to node 22b, where address 9 is located. Vector elements 4:15 of V0 corresponding to memory addresses 10:21 of memory vector A are assigned in a similar manner. This type of assignment results in no external communication for the first vector load (i.e., all vector elements of V0 are loaded from local memory).

Nevertheless, the second vector load has to follow the same mapping vector, otherwise the vector elements of architectural vector register V1 would not align with the vector elements of architectural vector register V0. Memory vector B in memories 28 maps only on nodes 22a and 22c. The particular element assignment of MV0 in this example leads to twelve remote memory accesses for the second vector load, as indicated by bold outlined boxes in PhV1 for memory addresses 32, 34, 36, 40, 42, 44, 48, 50, 52, 56, 58, and 60. For example, vector element 2 of V1 is assigned to node 22a, while address 34 is located on node 22c. The particular element assignment of MV0 in this example leads to four local memory accesses for the second vector load, for memory addresses 30, 38, 46, and 54, which are all in node 22c.

Therefore, in the example illustrated in FIGS. 3 and 4, a mapping vector was set to mirror the lay-out of memory vector A, and as a results V0 elements are loaded locally. Twelve elements of V1, however, require remote communication according to the same mapping vector. Thus, the mapping vector produces twelve remote accesses (all from loading memory vector B) out of a total of 32 accesses for the two loads of PhV0 and PhV1.

Gather and scatter instructions are easily implemented with distributed vector architecture system 20. For example, in one embodiment, application gather and scatter instructions are executed in the typical manner. For example, the following formula is used for a gather instruction:

PhVx[i]←(BaseAddress+PhVindex[i]).

In this case, a hidden indirection is that PhVindex (the index register) already follows a mapping vector which is inherited by PhVx.

Mapping Vector Selection

A mapping vector must be defined for every distinct computation slice. A computation slice is a group of related vector instructions that load some architectural vector registers 38, compute on the vector registers, and store the results in aggregate memory 36. Once a mapping vector is used to load or initialize an architectural vector register 36, the rest of the architectural vector registers 36 in the computation slice must use the same mapping vector for their vector elements to align properly in the corresponding physical vector registers 34.

The following example code II provides an illustration of two independent computation slices that are interleaved in an instruction stream:

---
Example Code II
---
DO 100 I=1,16
C(I)=A(I)+B(2*I)
F(I)=D(D+E(I)
100   CONTINUE
Compiled to:
---
SLICE1                                    SLICE2
---
SETMV MV0; BASE=A,STRIDE=1

VLOAD V0,BASE=A,STRIDE=1,MV0
                           SETMV MV1 BASE=D,STRIDE=1

VLOAD V3,BASE=D,STRIDE=1,MV1
VLOAD V1,BASE=B,STRIDE=2,MV0
VADD V0, V0+V1
                           VLOAD V4,BASE=E,STRIDE=1,MV1
                           VADD V3, V3+V4
                           VSTORE V3,BASE=F,STRIDE=1,MV1
VSTORE V0,BASE=C,STRIDE=1,MV0

---
-continued
---
Example Code II
---
where, MV0 = mapping vector 0
       MV1 = mapping vector 1
       V0 = architectural vector register V0
       V1 = architectural vector register V1
       V3 = architectural vector register V3
       V4 = architectural vector register V4.
---

To accommodate unrelated computation slices interleaved in the instruction stream more than one mapping vector is possibly needed. For example, in the above example code II, two different mapping vectors (MV0 and MV1) are employed, since it is highly likely that each computation slice performs better with its own assignment of the locations of its architectural vector elements. The number of mapping vectors needed depends on how many independent computation slices a particular system compiler interleaves. For example, CRAY compilers rarely interleave more than two independent computation slices. Thus, as few as two mapping vectors could be used with CRAY compilers. The useful range for mapping vectors is from one up to the number of architectural vector registers.

The goal for selecting a mapping vector for a computation slice is to minimize the overall communication of the slice's memory operations. In one embodiment, the mapping vector is selected at compile-time. In another embodiment, the mapping vector is selected at run-time. If the mapping vector is selected at compile-time, the compiler computes a mapping vector and stores it as static data along with the binary code of the application. When the binary code is executed, the mapping vector is simply loaded from memory into mapping vector registers 44. This provides the compiler with great flexibility in computing mapping vectors that minimizes the overall communication of a slice. Unfortunately, this approach requires considerable information to be available at compile-time. The base addresses and strides of the memory operations, as well as the run-time memory interleaving, must be known to compute mapping vectors. This information may not be available since base address and stride arguments (kept in scalar registers) are frequently unknown at compile-time. Thus, generating mapping vectors at compile time is not trivial and requires considerable compiler involvement.

One way to construct the mapping vectors at run-time is with special SETMV instruction. In an alternative embodiment, instead of a specialized instruction, such as the SETMV instruction, the compiler inserts code that computes traffic efficient mapping vectors at run-time. It is likely that saving a few remote transfers makes up for the additional time spent in computing the mapping vectors. There are numerous possible instructions or groups of instructions that can be implemented to provide equivalent functionality of the SETMV instruction, and possibly provide additional or different functional features for achieving the result of properly setting the mapping vector registers 44.

As to the special SETMV instruction, the SETMV instruction has three arguments: a mapping vector identifier; a base address; and a stride. An example syntax in an example pseudo-assembly is "SETMV MV0, base=A, stride=N" or "SETMV MV0, S1, S2" where S1 and S2 are scalar registers. The SETMV instruction creates a mapping vector that mirrors a memory vector whose lay-out is defined by the base address and the stride. Each node 22 decides which vector elements of the architectural vector register 38 are be assigned to it. In one embodiment, this assigning is performed in a distributed fashion where each node 22 generates all the addresses of the memory vector and decides which of the addresses, according to the memory interleaving used at that instant, are local. Each node 22 assigns vector elements corresponding to local memory 28 addresses to its physical vector register 34 elements.

The SETMV semantics are straightforward when the number of local memory addresses in a node 22 is equal to its physical vector length. There are cases, however, where some nodes 22 have more vector elements in their local memory 28 than what they can fit in their physical vector registers 34, which signals an element overflow condition. At the same time, other nodes 22 do not have enough local vector elements in their local memory 28 to fill their physical vector registers 34. For instance, in the example code I above, if the lay-out of vector B is alternatively used as the basis for setting the mapping vector (i.e., SETMV MV0, base=30, stride=2), nodes 22a and 22c would each try to assign eight vector elements in their four-element physical vectors. The SETMV instruction semantics are aware of such cases and redistribute vector elements when this happens. In one embodiment, this redistribution is again done in a distributed fashion, without any communication between nodes 22.

Since every node 22 runs through all the memory addresses of the SETMV instruction, the nodes can keep count of vector elements assigned in all nodes. Every node 22 implements a number of counters, with at least one counter for each node in the system. The counters' size is equal to the length of the physical vector registers 34. A counter overflow condition indicates that a node 22 is full. Responsibility for the extra vector elements in an overflowing node 22 passes to the first non-full node 22 according to a pre-specified order (e.g., based on a node identifier). This continues until all architectural vector elements are assigned to some node 22. This algorithm is independent of the relative speed of the nodes 22 and guarantees that no assignment conflicts will occur.

The SETMV instruction limits the mapping vector to mirror a memory vector described only by a base address and a stride. In an alternative embodiment, arbitrary mapping vectors are generated with an indexed version of the SETMV. A system according to this embodiment employs an index register to help describe any irregular memory vectors.

In one embodiment, the compiler inserts a SETMV instruction at the beginning of every computation slice and chooses its base address and stride arguments. These arguments can be literals or scalar register identifiers. These arguments are copied from one of the load or store instructions of the corresponding computation slice. In other words, a mapping vector is chosen for a computation slice to mirror a memory vector referenced in that computation slice. According to the available information, the compiler makes choices of varying optimality for selecting these arguments. In first choice selection, if the compiler has no information about the run-time interleaving or the base addresses and strides of the loads and stores of a computation slice, the compiler blindly copies the arguments of the first load (or store) it encounters in the computation slice. In best choice selection, if the compiler does have information on base addresses, strides and run-time interleaving, the compiler selects the arguments of a load or store that leads to less overall traffic for the whole computation slice.

On form of best choice selection is based on the following heuristic, but many other forms of best choice selection are possible. For each memory operation in the computation slice, all of its memory addresses are generated and the home node for all of its vector elements are computed according to the run-time memory interleaving. The home nodes of each memory operation are then compared to the home nodes of all the other memory operations. The home nodes with the most matches are then selected.

For a typical vector program the compiler is able to make an intelligent choice for some of the computation slices, but not for others. Thus, the resulting compiled program contains a mix of SETMV instructions based on the best choice selection and SETMV instructions based on the first choice selection.

In a distributed vector architecture program, vector loads and stores must designate a mapping vector. In one embodiment, this designation is implemented by using an extra mapping vector identifier field in the instructions. Alternatively, one of the mapping vectors is implicitly active. In this alternative case, a new instruction is needed to activate a mapping vector. Arithmetic or logic vector instructions do not have to designate a mapping vector, since they operate on vector registers already loaded or initialized according to a specific mapping vector.

Memory Interleaving

In a multiprocessor vector/scalar computer system having a distributed vector architecture, such as system 20 of FIG. 1, it is desired that data placement be controlled so that memory vectors of an application can be distributed and aligned. It is also desired that memory vectors be distributed across nodes 22 to take advantage of the system's multiple vector units 30 and the ability to distribute the architectural vector registers 38. It is also desired to align memory vectors accessed in the same computation slice, to minimize remote traffic. Proper distribution and alignment of memory vectors can be achieved in a variety of ways. For example, the compiler can allocate arrays and other data structures appropriately or in custom ways. A second way is to use directives in the source code to specify particular allocation policies for data alignment and distribution. A third way to distribute memory vectors across nodes 22 is by interleaving memory.

When using memory interleaving as a way to distribute memory vectors across nodes 22, remote traffic in the distributed vector architecture system 20 is a function of memory interleaving and mapping vector selection. Without any other provision for custom data placement, simply interleaving memory leads to acceptable distribution of memory vectors, but it does not offer any help in preventing misalignment of related vectors.

In one embodiment, the memory in distributed vector architecture system 20 is interleaved by selecting which bits of an address are the node address bits. By using the low order bits of an address, words are interleaved in nodes 22. Shifting the node address bits toward the high order bits of an address results in interleaving larger and larger blocks. For example, if the node address bits are shifted four places toward the high order bits, blocks of sixteen words are interleaved among nodes 22.

In one embodiment, the operating system sets the run-time interleaving for each application. In one embodiment, the operating system performs simultaneous multiple interleavings for the same application. Simultaneous multiple interleavings for the same application serves to distribute different data structures in memory. For example, the two factors of a matrix multiplication can be interleaved differently so their memory vectors are distributed in the same manner.

For many of example kernels, there is a correlation between distributed vector architecture inter-node traffic for a specific interleaving and the predominant stride and vector length. For some kernels, the interleavings that produce the lowest inter-node traffic correspond to the interleavings that distribute memory vectors with the dominant stride and vector length evenly across all nodes 22. For a memory vector of stride S and length L, two interleavings I, where I is defined as the size of an interleaving block, that distribute the memory vector on N nodes 22 are given by the following equations:

Equation I: I=S/N*L
Equation II: I=S.

Some kernels have low inter-node traffic at points approximately described by both the equations I and II, while other kernels have low inter-node traffic points described by the equation I. Broadly speaking, the explanation of this result is that equation I produces interleavings that distribute memory vectors in contiguous groups of vector elements among nodes 22 while equation II distributes consecutive vector elements among nodes 22. The amount of inter-node traffic is then determined by how well different vectors used in the same computation align in nodes 22. It is more likely for two vectors to align in the same node, if the vectors are distributed in contiguous groups, than to align when the vectors' consecutive elements are interleaved in nodes 22. Equations I and II represent only two of many suitable interleaving assignments.

The following example code III that produces a common reference pattern in vector applications illustrates the above situation:

| Example Code III |
| --- |
| DO 100 I=1,16 |
| A[I] = A[I+1] * 3.14159 |
| 100   CONTINUE |

Figure 5:
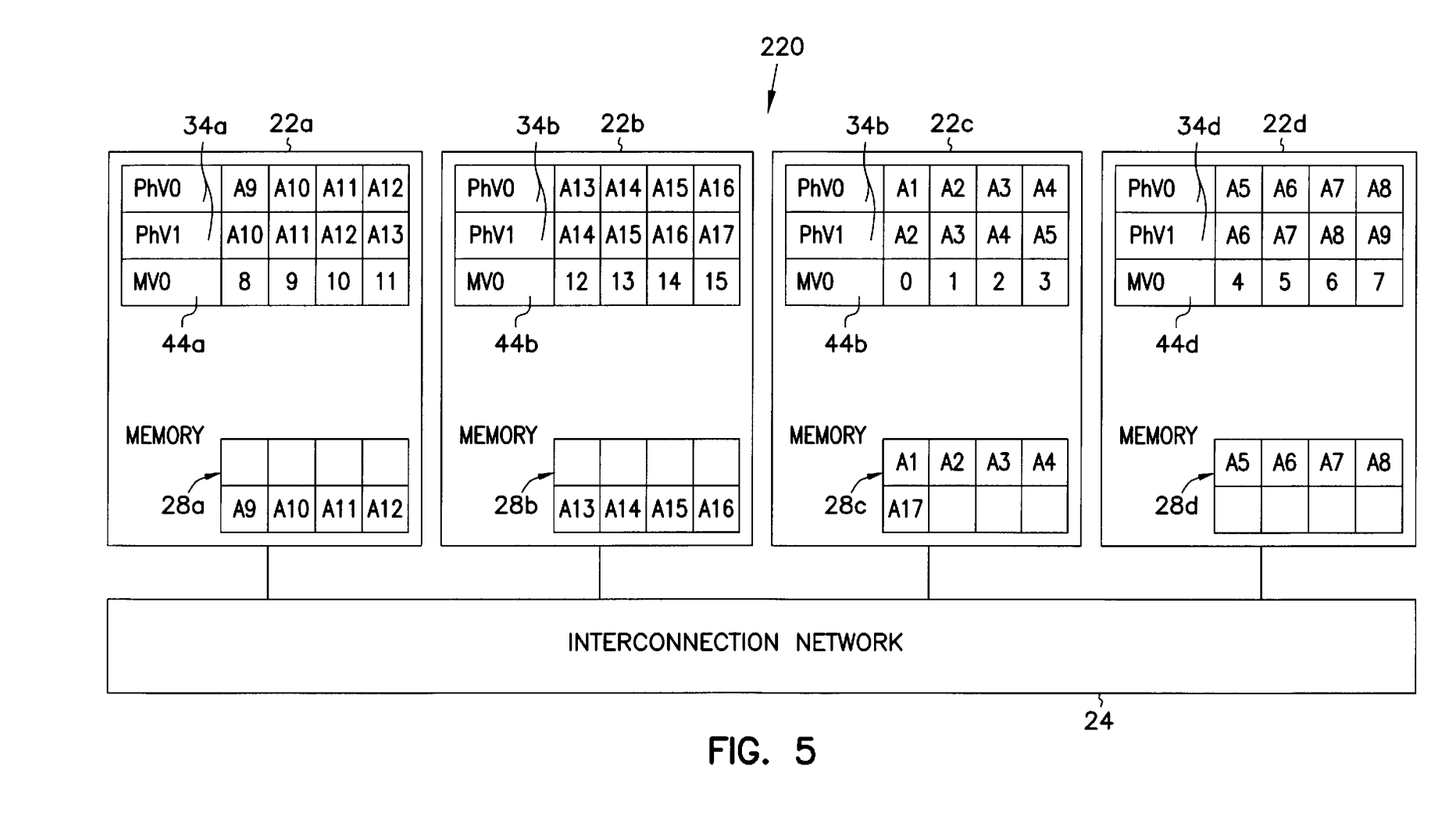
FIG. 5 is a block diagram of a distributed vector architecture system according to the present invention illustrating the execution of an example code, where the system distributes memory vectors in groups of contiguous elements.

FIG. 5 illustrates the state of a distributed vector architecture system 220 after executing two loads of PhV0 and PhV1 for the above example code III, where system 220 distributes memory vectors in groups of contiguous elements according to the above equation I. In FIG. 5, A[I] and A[I+1] are assumed to be loaded with two independent load instructions without any optimization at the vector register level. Thus, memory vector A is accessed twice in the same loop with an offset of one. By distributing vector A in memories 28 according to equation I, a misalignment occurs in the two sets of accesses. For this example the mapping vector is set to mirror the lay-out of memory vector A[I] such that the first set of accesses (i.e., A[I] accesses) executes with no remote traffic. However, the second set of accesses (i.e., A[I+1] accesses) executes with four remote accesses (i.e., A5, A9, A13, and A17) out of a total of sixteen accesses.

Figure 6:
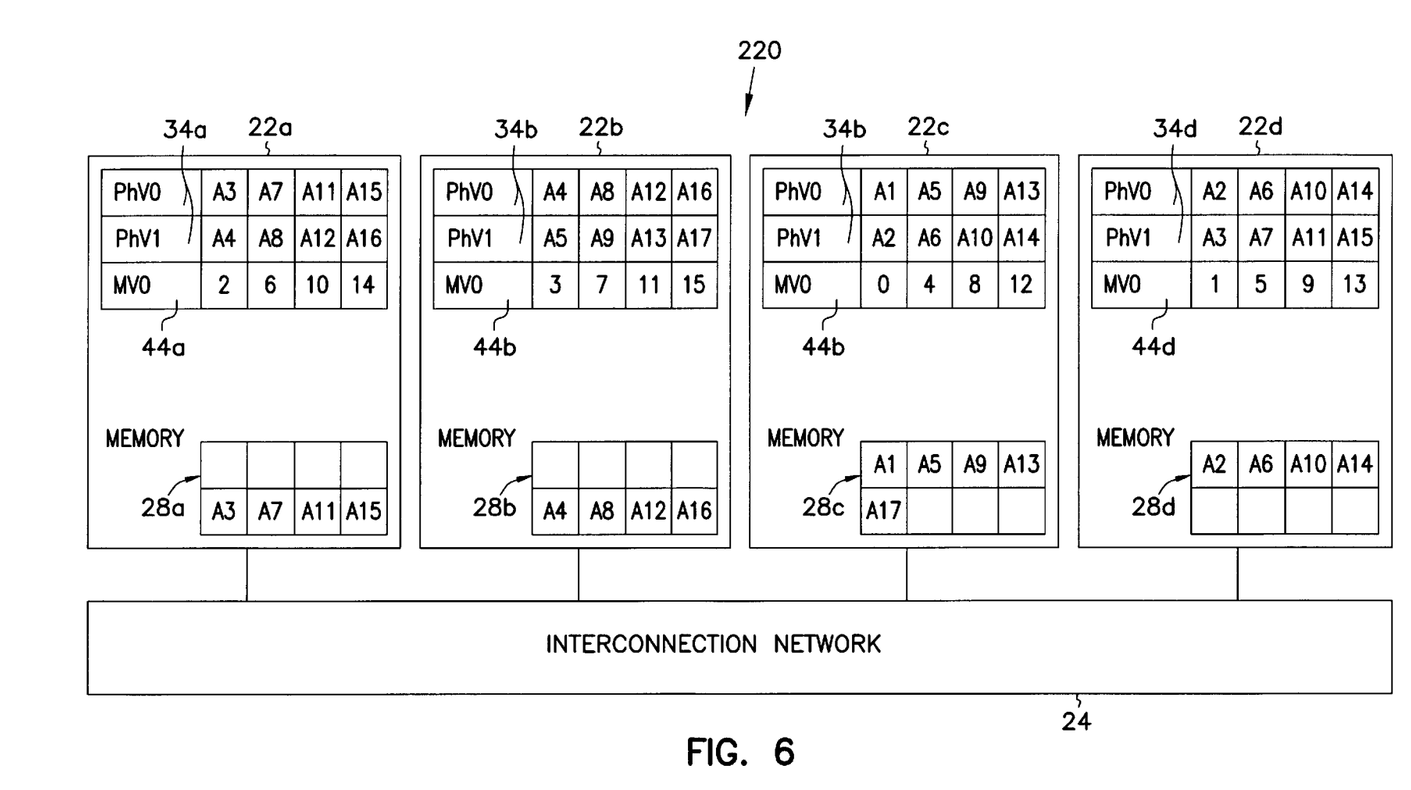
FIG. 6 is a block diagram of a distributed vector architecture system according to the present invention illustrating the execution of an example code, where the system distributes memory vectors in consecutive elements around nodes.

FIG. 6 illustrates the state of distributed vector architecture system 220 after executing two loads of PhV0 and PhV1 for the above example code III, where system 220 distributes memory vectors in consecutive elements around nodes 22 according to the above equation II. In FIG. 6, A[I] and A[I+1] are assumed to be loaded with two independent load instructions without any optimization at the vector register level. Thus, memory vector A is accessed twice in the same loop with an offset of one. By distributing vector A in memories 28 according to equation II, a more serious misalignment occurs in the two sets of accesses as compared to distributing vector A according to equation I. For this example the mapping vector is set to mirror the lay-out of memory vector A[I] such that the first set of accesses (i.e., A[I]) accesses) executes with no remote traffic. In the FIG. 6 example, however, none of the A[I] accesses and A[I+1] accesses align in any node 22. As a result, the second set of accesses (i.e., A[I+1] accesses) executes with all remote accesses. In other words, if a mapping vector generates no remote traffic for the A[I] accesses then the same mapping vector makes all A[I+1] accesses remote.

As illustrated in the above examples, the best way to distribute these memory vectors depends on the vector alignment properties. Many times, distributing the vector elements in contiguous parts proves to be effective. In the absence of reference patterns similar to that illustrated in FIG. 6, distributing consecutive elements across the nodes can also lead to minimal inter-node traffic.

The predominant stride and vector length of the programs need to be determined to properly select an interleaving according to equation I, while the vector length of the programs need to be determined to properly select an interleaving according to equation II. In one embodiment, the compiler provides predominant stride and vector length values. For applications where it is not feasible for the compiler to provide these values, profiling can be used to determine these values.

Data Placement

Custom data placement in memory is one way of optimizing distributed vector architecture programs. For example, prime number array dimensions, which are good for avoiding bank conflicts in supercomputers, can produce misalignment problems in a distributed vector architecture system. Data structures in memory can be allocated to reduce misalignment of memory vectors. In its general form, this is not a trivial problem. Nevertheless, one approach which does not change the structure of the programs, re-allocates the programs' multi-dimensional arrays so that some, but not all, of the dimensions became powers-of-two. This more simple approach still significantly reduces inter-node traffic. In essence, allocating with powers-of-two dimensions results in statistically much less misalignment of memory vectors.

CONCLUSION

The above described distributed vector architecture system 20 according to the present invention takes advantage of processors 26 and local memory 28 being tightly packaged together, such as being the same integrated circuit chip. With integrated processor/memory device (nodes 22), the bandwidth/latency of a processor 26 to its local memory 28 is orders of magnitude superior to its bandwidth/latency to remote memory. Under such conditions, applications that fit in local memory 28 perform extremely well. Applications that are can be parallelized in a distributed fashion, where each thread fits in a local memory 28 and there is very little communication between the threads, also performs extremely well under such conditions. However, applications that do not fit in local memory 28 and are not amenable to parallelization in a distributed fashion are greatly limited by the required remote traffic. An important class of applications including several large proprietary codes belong in this last category.

The distributed vector architecture system according to the present invention runs such applications when the applications are dominated by vector computations. Such a vector application is placed on as many nodes 22 as needed to hold its entire data set and uses the nodes 22 together as one large vector processor. The physical vector registers 34 on the individual nodes 22 combine together to form architectural vector registers 38 referenced by the vector application. Variable mappings of architectural vector elements 42 to physical vector elements 40 are selected to reduce remote accesses. The mapping vectors are used to specify the correspondence of architectural to physical elements at any instant. In one embodiment, a SETMV vector instruction is used to creates mapping vectors. By properly selecting the SETMV arguments traffic efficient mapping vectors are created. Memory interleaving also has a significant effect on the amount of remote traffic. Custom data placement also can be used to reduce remote traffic. For example, better alignment of data arrays can result in lower remote traffic.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A vector/scalar computer system comprising:
   a plurality of processing element nodes, each processing element node includes:
      a vector execution unit,
      a scalar execution unit,
      physical vector registers holding physical vector elements, wherein physical vector registers from the plurality of processing element nodes together form an architectural vector register having architectural vector elements,
      a mapping vector register holding a mapping vector defining an assignment of architectural vector elements to physical vector elements for its node, and
      a memory, wherein memories from the plurality of processing element nodes together form an aggregate memory; and
   an interconnect network interconnecting the processing element nodes.

2. The vector/scalar computer system claim 1 wherein the processing element nodes each have their vector execution unit, scalar execution unit, physical vector registers, mapping vector register, and memory integrated in one integrated device.

3. The vector/scalar computer system claim 2 wherein the integrated devices are multi-chip modules.

4. The vector/scalar computer system claim 2 wherein the integrated devices are single integrated circuit chips.

5. The vector/scalar computer system claim 1 wherein the mapping vector is dynamically created and then stored in the mapping vector register with a special vector instruction.

6. The vector/scalar computer system claim 1, wherein a given vector application running on the vector/scalar computer system references the architectural vector registers.

7. The vector/scalar computer system of claim 6, wherein the memories store memory vector elements and wherein the given vector application loads memory vector elements from the memories to the physical vector registers, and stores physical vector elements from the physical vector registers to the memories.

8. The vector/scalar computer system of claim 7 wherein the memory vector elements are interleaved among the memories of the plurality of processing element nodes to reduce inter-node traffic during the loads and the stores.

9. The vector/scalar computer system of claim 1 wherein the mapping vector is created and then stored in the mapping vector register at compile time.

10. The vector/scalar computer system of claim 1 wherein the mapping vector is created and then stored in the mapping vector register at run time.

11. The vector/scalar computer system of claim 10 wherein the mapping vector is created and then stored in the mapping vector register prior to a computation slice.

12. A method of operating a vector/scalar computer system having a plurality processing element nodes interconnected by an interconnect network, wherein each processing element node includes a processor having physical vector registers holding physical vector elements and memory storing memory vector elements, wherein memories from the plurality of processing element nodes together form an aggregate memory, the method comprising the steps of:
   defining architectural vector registers, each holding architectural vector elements, and each formed from the physical vector registers from the plurality of nodes, and wherein a given vector application running on the vector/scalar computer system references the architectural vector registers;
   assigning architectural vector elements to physical vector elements for each node;
   loading memory vector elements from the memories to the physical vector registers; and
   storing physical vector elements from the physical vector registers to the memories.

13. The method of claim 12 wherein the assigning step is dynamically performed.

14. The method of claim 12 further comprising the step of:
   interleaving memory vector elements among the memories of the plurality of nodes to reduce inter-node traffic during the loading and storing steps.

15. The method of claim 12 wherein the assigning step is performed at compile time.

16. The method of claim 12 wherein the assigning step is performed at run time.

17. The method of claim 12 wherein the assigning step is performed prior to a computation slice.

* * * * *